(12) United States Patent
Hirayama (10) Patent No.: US 10,643,310 B2
(45) Date of Patent: May 5, 2020

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Shingo Hirayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 15/904,083

(22) Filed: Feb. 23, 2018

(65) Prior Publication Data
US 2018/0253829 A1 Sep. 6, 2018

(30) Foreign Application Priority Data

Mar. 1, 2017 (JP) .................. 2017-038110

(51) Int. Cl.
| | |
|---|---|
| G06K 9/40 | (2006.01) |
| G06T 5/00 | (2006.01) |
| H04N 5/232 | (2006.01) |
| H04N 5/217 | (2011.01) |
| G03B 7/02 | (2006.01) |
| G06T 1/00 | (2006.01) |
| H04N 5/225 | (2006.01) |

(52) U.S. Cl.
CPC ............. G06T 5/002 (2013.01); G03B 7/02 (2013.01); G06T 1/0007 (2013.01); H04N 5/217 (2013.01); H04N 5/2256 (2013.01); H04N 5/232 (2013.01)

(58) Field of Classification Search
CPC ....... G06T 5/002; G06T 1/0007; H04N 5/232; H04N 5/217; H04N 5/2256; H04N 5/23212; G03B 7/02

USPC .................................. 382/254–275
See application file for complete search history.

(56) References Cited

U.S. PATENT DOCUMENTS

| 6,982,755 B1 | 1/2006 | Kikuzawa | |
|---|---|---|---|
| 2014/0161368 A1* | 6/2014 | Kanda | H04N 5/2254 382/255 |
| 2017/0142338 A1* | 5/2017 | Tanaka | G03B 5/00 |

FOREIGN PATENT DOCUMENTS

| JP | 2006-94450 A | 4/2006 |
|---|---|---|
| JP | 2012-100066 A | 5/2012 |

* cited by examiner

Primary Examiner — Andrew M Moyer
(74) Attorney, Agent, or Firm — Canon U.S.A., Inc. IP Division (57) ABSTRACT

An image processing apparatus capable of acquiring images with high visibility is provided. A system control circuit of an image processing apparatus acquires the turning speed of the image capturing device capable of being turned, determines a first intensity as the intensity of noise reduction processing when the turning speed is higher than a speed in a predetermined speed range, and determines a second intensity lower than the first intensity as the intensity of the noise reduction processing when the turning speed is within the predetermined speed range. An image processing circuit of the image processing apparatus performs the noise reduction processing on an image of a target frame, which is one of a plurality of images of frames captured by the image capturing device, at the determined intensity, based on the image of the target frame and an image of a frame preceding the target frame.

19 Claims, 7 Drawing Sheets

IMAGE PROCESSING APPARATUS, METHOD FOR CONTROLLING IMAGE PROCESSING APPARATUS, AND STORAGE MEDIUM

BACKGROUND OF THE INVENTION

Field of the Invention

The present invention relates to an image processing apparatus, a method for controlling an image processing apparatus, and a storage medium.

Description of the Related Art

Network cameras are expected to capture images with high visibility under various environments. However, when an image capturing device of a network camera is turned (driven in a pan or tilt direction), image deletion can occur to produce video images lacking visibility.

To solve this problem, Japanese Patent Application Laid-Open No. 2006-94450 discusses the following technique. Specifically, the turning speeds VP and VT of a monitoring camera in pan and tilt directions are detected, and if the detected speeds are higher than respective preset threshold values VPth and VTth, processing is performed on image signals to reduce the luminance, contrast, or resolution of a displayed image.

Meanwhile, cyclic type noise reduction processing is known as noise reduction processing. In cyclic type noise reduction processing, noise components are extracted and removed based on a difference in signal values between an image of a target frame and an image of a previous frame immediately preceding the target frame. In cyclic type noise reduction processing, the processing is performed using a plurality of frame images captured at different time points, so that if the cyclic type noise reduction processing is performed with high intensity, afterimages may occur to make it impossible to ensure visibility.

However, Japanese Patent Application Laid-Open No. 2006-94450 is silent on the problem of visibility in cyclic type noise reduction processing.

SUMMARY OF THE INVENTION

The present invention is directed to a technique capable of acquiring images with high visibility.

According to an aspect of the present invention, an image processing apparatus includes at least one memory device, at least one processor, a determination unit configured to acquire a turning speed of an image capturing device capable of turning, determine a first intensity as an intensity of noise reduction processing when the turning speed is higher than a speed in a predetermined speed range, and determine a second intensity lower than the first intensity as the intensity of the noise reduction processing when the turning speed is within the predetermined speed range, and a processing unit configured to perform the noise reduction processing on an image of a target frame at the determined intensity based on the image of the target frame and an image of a frame preceding the target frame among a plurality of images of frames captured by the image capturing device, wherein the determination unit and the processing unit are implemented by the at least one processor executing at least one program recorded on the at least one memory device.

Further features of the present invention will become apparent from the following description of exemplary embodiments with reference to the attached drawings.

DESCRIPTION OF THE EMBODIMENTS

Various exemplary embodiments of the present invention will be described in detail below with reference to the drawings.

Figure 1:
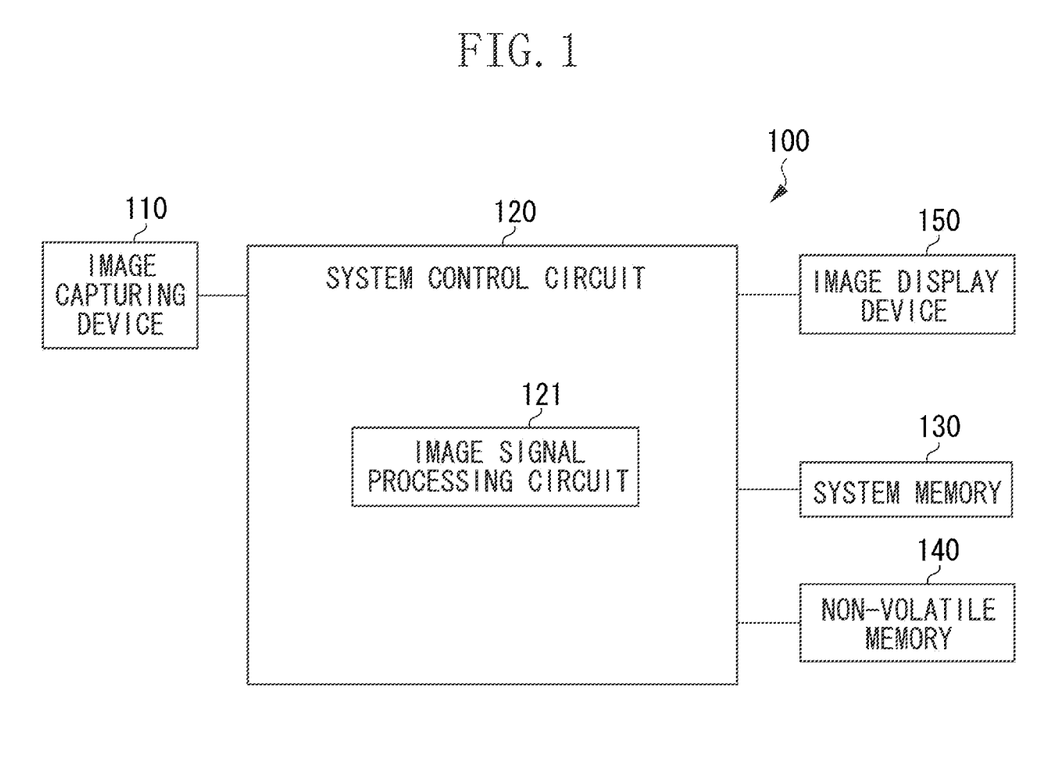
FIG. 1 is a block diagram illustrating an image capturing apparatus.

First, the configuration of an image capturing apparatus 100 according to a first exemplary embodiment will be described below with reference to FIG. 1. FIG. 1 is a block diagram illustrating the image capturing apparatus 100. The image capturing apparatus 100 is an example of an image processing apparatus and is, for example, a network camera. The image capturing apparatus 100 includes an image capturing device 110, a system control circuit 120, a system memory 130, a non-volatile memory 140, and an image display device 150.

The image capturing device 110 can be turned in pan and tilt directions to capture moving images including images of a plurality of frames. The image capturing device 110 includes a lens group, an infrared ray cut filter (IRCF), an image sensor, a correlated double sampling (CDS) circuit, an automatic gain control (AGC) amplifier, and an analog to digital (A/D) converter. The image capturing device 110 is also referred to as "camera device".

The lens group of the image capturing device 110 forms an optical image of a subject on the image sensor.

The IRCF of the image capturing device 110 is an infrared ray cut filter. When the image capturing device 110 captures a subject image, an optical image having passed through the lens group and the IRCF is formed on the image sensor.

The image sensor of the image capturing device 110 includes a charge-coupled device (CCD) sensor or complementary metal oxide semiconductor (CMOS) sensor configured to convert optical images into electric signals. The image sensor photoelectrically converts the formed optical image into an analog image signal and outputs the analog image signal.

The CDS circuit of the image capturing device 110 performs correlated double sampling processing and other processing on the electric signals input from the image sensor. The AGC amplifier of the image capturing device 110 performs amplification processing, and other processing on the electric signals input from the CDS circuit.

The A/D converter of the image capturing device 110 converts, into digital signals, the analog signals having undergone the amplification processing performed by the AGC amplifier.

The system control circuit 120 is a processor such as a central processing unit (CPU) or microprocessor unit (MPU) and controls the entire image capturing apparatus 100. The system control circuit 120 loads a program recorded on the non-volatile memory 140 into the system memory 130, and executes the loaded program to realize a process illustrated in a flowchart in FIG. 2, and in other flowcharts.

A random-access memory (RAM) is used as the system memory 130, and constants and variables for operating the system control circuit 120, a program read from the non-volatile memory 140, and the like are loaded into the system memory 130.

The non-volatile memory 140 is an example of a storage medium and is an electrically erasable programmable memory. For example, an electrically erasable programmable read-only memory (EEPROM) is used as the non-volatile memory 140. The non-volatile memory 140 stores the constants for operating the system control circuit 120, programs, and the like. As used herein, the term "program" refers to a program for executing various flowcharts described below.

The image display device 150 is a monitor capable of displaying moving images and the like captured by the image capturing device 110 and processed by the system control circuit 120.

The system control circuit 120 includes an image signal processing circuit 121. This is a function realized by the system control circuit 120 executing the program recorded on the non-volatile memory 140. Alternatively, the image signal processing circuit 121 may be provided separately from the system control circuit 120 as an integrated circuit including circuits for performing respective types of signal processing.

The image signal processing circuit 121 performs image signal processing based on the digital signals converted by the A/D converter of the image capturing device 110. The image signal processing includes white balance (WB) processing, gamma correction processing, and noise reduction (NR) processing.

The image display device 150 displays images processed by the image signal processing circuit 121.

The NR processing performed by the image signal processing circuit 121 includes cyclic type noise reduction processing (hereinafter, also referred to as "cyclic NR").

Now, the cyclic NR will be described. The cyclic NR is one of noise reduction processing methods performed on an image of a target frame based on the image of the target frame and an image of a previous frame preceding the target frame in the temporal direction. A frame immediately preceding the target frame is used as the previous frame preceding the target frame. The target frame is one of the frames of images captured by the image capturing device 110. For example, the target frame is a frame of an image that is most recently captured by the image capturing device 110.

The cyclic NR will be described in more detail below. A signal value $A'_N$ of the image of the target frame after cyclic NR is expressed by formula (1) below $$A'_N = K \times A'_{N-1} + (1-K) \times A_N = A_N - K \times (A_N - A'_{N-1}) \qquad (1),$$

where $A_N$ is a signal value of the image of the target frame, $A'_{N-1}$ is a signal value of the image of the previous frame immediately preceding the target frame after cyclic NR, and K ($0 \leq K \leq 1$) is a cyclic coefficient.

As described above, the cyclic NR is the processing to bring the signal value of the image of the target frame into the signal value $A'_N$. The cyclic coefficient K represents the intensity of cyclic NR, and the intensity of cyclic NR increases as the cyclic coefficient K increases. As apparent from formula (1), as the cyclic coefficient K increases, the signal value $A'_N$ approaches the signal value $A'_{N-1}$. Further, as the cyclic coefficient K decreases, the signal value $A'_N$ approaches the signal value $A_N$.

In an initial state of the image capturing apparatus 100, the intensity of cyclic NR is an intensity S1.

The system control circuit 120 performs control to drive the image capturing device 110 in the pan or tilt direction to turn the image capturing device 110. More specifically, the system control circuit 120 outputs a turning control signal to a driving unit included in the image capturing device 110 so that the driving unit turns the image capturing device 110 based on the turning control signal. The turning control signal contains information about the driving angle, moving amount, turning speed, and the like.

Further, the system control circuit 120 acquires a turning speed V of the image capturing device 110. The system control circuit 120 may acquire the turning speed V of the image capturing device 110 from the image capturing device 110 or from information generated by the system control circuit 120.

Further, the system control circuit 120 determines the intensity of cyclic NR based on the turning speed V of the image capturing device 110. The image signal processing circuit 121 performs cyclic NR at the cyclic NR intensity determined by the system control circuit 120.

Figure 2:
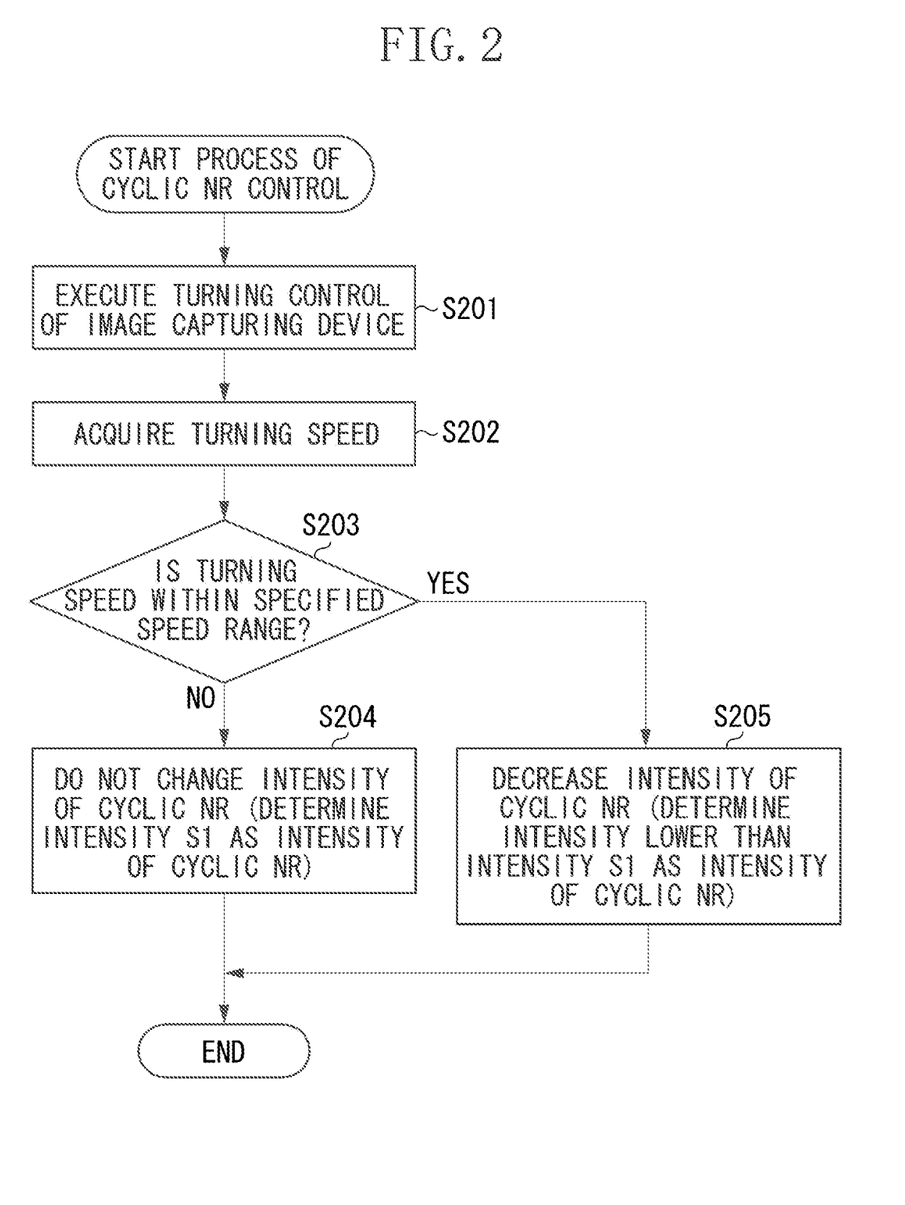
FIG. 2 is a flowchart illustrating a process of cyclic noise reduction (NR) control according to a first exemplary embodiment.

Next, a process of cyclic NR control will be described below with reference to FIG. 2. FIG. 2 is a flowchart illustrating the process of cyclic NR control. The process of cyclic NR control is a process of determining the intensity of cyclic NR to control cyclic NR.

In step S201, the system control circuit 120 outputs the turning control signal to execute turning control of the image capturing device 110. The image capturing device 110 is driven and turned in the pan or tilt direction based on the control performed by the system control circuit 120.

In step S202, the system control circuit 120 acquires the turning speed V of the image capturing device 110.

In step S203, the system control circuit 120 determines whether the acquired turning speed V of the image capturing device 110 is within a specified speed range, which is a predetermined speed range determined in advance.

Here, the specified speed range will be described. The specified speed range is a range in which the turning speed V satisfies formula (2) below using a first speed V1 and a second speed V2 that is lower than the first speed V1.

$$V2 < V < V1 \qquad (2)$$

The first speed V1 is a predetermined speed used as a threshold value determined in advance. The first speed V1 is set to satisfy, for example, a condition that it is difficult to follow an object with the eyes of a person when the object is moving at the first speed V1 or faster. The first speed V1 may be set to an average walking speed of the person and is set experimentally or empirically according to the purpose of use and performance of the image capturing apparatus 100. In the present exemplary embodiment, the second speed V2 is "0". Alternatively, the second speed V2 can be higher than "0".

In step S203, if the system control circuit 120 determines that the acquired turning speed V of the image capturing device 110 is within the specified speed range (YES in step S203), the processing proceeds to step S205. In other words, in step S203, if the system control circuit 120 determines that the turning speed V of the image capturing device 110 is lower than the first speed V1 and higher than zero (YES in step S203), the processing proceeds to step S205.

On the other hand, if the system control circuit 120 determines that the turning speed V of the image capturing device 110 is not within the specified speed range (NO in step S203), the processing proceeds to step S204.

In step S204, the system control circuit 120 does not change the intensity of cyclic NR from the intensity in the initial state and determines the intensity S1 in the initial state as the intensity of cyclic NR.

In step S205, the system control circuit 120 determines, as the intensity of cyclic NR, an intensity S2 that is lower than the intensity S1. The intensity S2 may be set to an intensity at which a signal-noise (S/N) ratio falls within an allowable range for images having undergone cyclic NR or an intensity at which afterimages are not likely to occur in images when cyclic NR is executed, and the intensity S2 is set experimentally or empirically according to the purpose of use or performance of the image capturing apparatus 100.

The image signal processing circuit 121 performs cyclic NR on the image of the target frame captured by the image capturing device 110 at the cyclic NR intensity determined in step S204 or S205 by the system control circuit 120. Then, the image display device 150 displays the image having undergone cyclic NR. The image of the target frame is an image that is most recently captured by the image capturing device 110. The image signal processing circuit 121 continues cyclic NR while the image capturing device 110 captures images.

Figure 3:
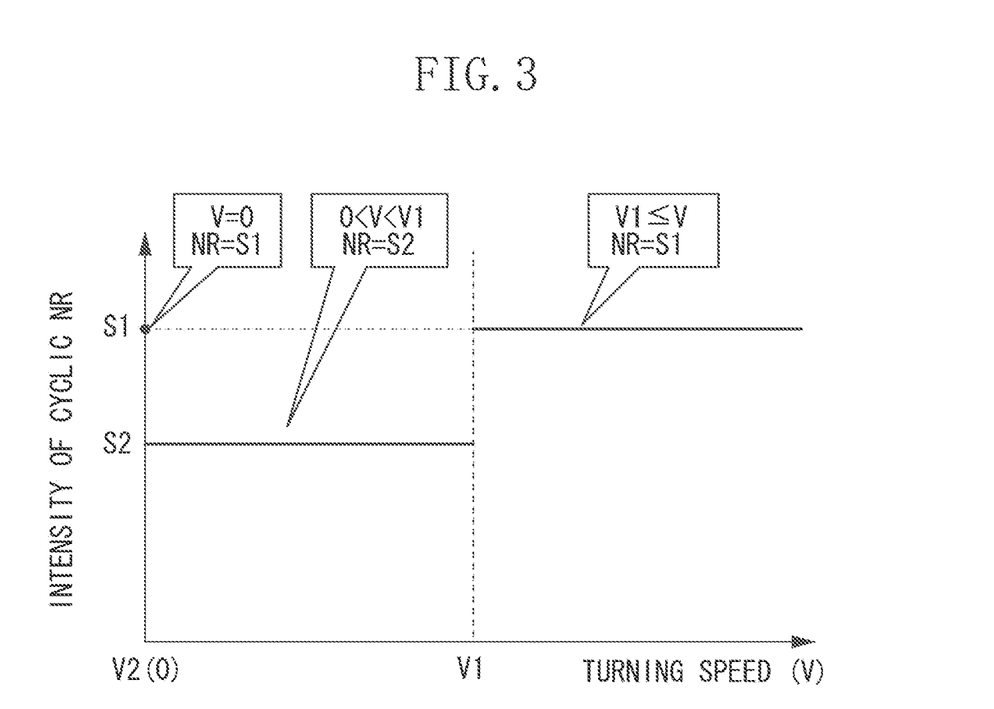
FIG. 3 illustrates an example of a cyclic NR intensity graph.

Next, an example of the cyclic NR intensity determined in step S204 or S205 in FIG. 2 will be described below with reference to FIG. 3. FIG. 3 illustrates an example of a cyclic NR intensity graph. The horizontal axis of the cyclic NR intensity graph is the turning speed V of the image capturing device 110. The vertical axis of the cyclic NR intensity graph is the intensity of cyclic NR.

As illustrated in FIG. 3, the system control circuit 120 determines the intensity S1 as the intensity of cyclic NR when the turning speed V of the image capturing device 110 is the second speed V2(0). Alternatively, the system control circuit 120 may determine an intensity that is other than the intensity S1 and higher than the intensity S2 as the intensity of cyclic NR when the turning speed V of the image capturing device 110 is the second speed V2(0). For example, the system control circuit 120 may determine an intensity that is higher than the intensity S1 as the intensity of cyclic NR when the turning speed V of the image capturing device 110 is the second speed V2(0). Further, the system control circuit 120 determines the intensity S2 as the intensity of cyclic NR when the turning speed V of the image capturing device 110 satisfies "V2<V<V1". Further, the system control circuit 120 determines the intensity S1 as the intensity of cyclic NR when the turning speed V of the image capturing device 110 is the first speed V1 or higher.

In the present exemplary embodiment, in step S203, if the turning speed V of the image capturing device 110 is the first speed V1, the processing proceeds to step S204. However, the processing to be performed if the turning speed V of the image capturing device 110 is the first speed V1 is not limited to the above-described example. Thus, in step S203, if the turning speed V of the image capturing device 110 is the first speed V1, the processing may proceed to step S205. In other words, the specified speed range can be set as expressed by formula (3) below, $$V2 < V \leq V1 \qquad (3).$$

In the case in which the image capturing device 110 is turned to capture images, as the intensity of cyclic NR increases, afterimages in entire images are more intensified due to an effect of cyclic NR.

However, the system control circuit 120 according to the present exemplary embodiment decreases the intensity of cyclic NR in the case in which the turning speed V of the image capturing device 110 is within the specified speed range, compared to the case in which the turning speed V of the image capturing device 110 is higher than a speed in the specified speed range.

As a result, in the case in which the turning speed V is within the specified speed range, since the intensity of cyclic NR is decreased, the effect of afterimages occurring in images decreases, so that images with high visibility can be acquired. Further, in the case in which the turning speed V of the image capturing device 110 is higher than a speed in the specified speed range, it is difficult to recognize afterimages with human eyes, so that even if afterimages occur in images, the effect of the afterimages on visibility is small. Therefore, the image capturing apparatus 100 according to the present exemplary embodiment can acquire images with overall high visibility.

Further, the specified speed range is expressed by formula (2) described above. Further, the second speed V2 in formula (2) is "0". Thus, when the image capturing device 110 is not turning, cyclic NR is executed at the intensity S1 that is high intensity. When the image capturing device 110 is not turning, the subject to be captured by the image capturing device 110 is less likely to be moving, so that even if cyclic NR is executed at high intensity, afterimages are not likely to occur in images, and images with high visibility are acquired as a result of cyclic NR.

Figure 4:
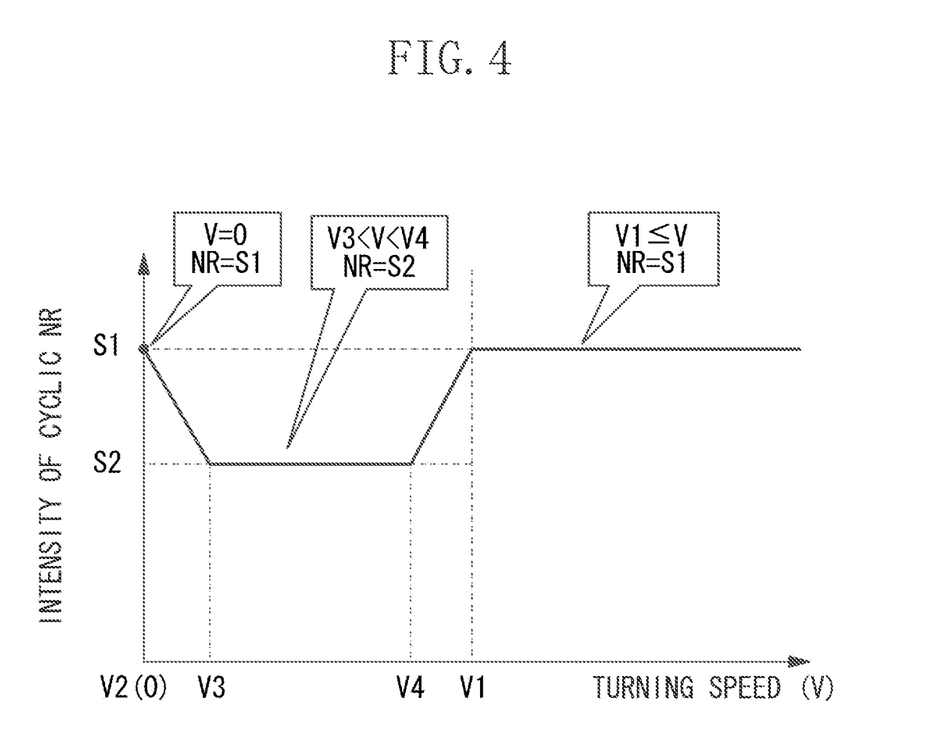
FIG. 4 illustrates an example of a cyclic NR intensity graph.

In step S205, the system control circuit 120 can determine the intensity of cyclic NR as illustrated in FIG. 4. FIG. 4 illustrates another example of the cyclic NR intensity graph. As illustrated in FIG. 4, the system control circuit 120 may determine, as the intensity of cyclic NR, an intensity that decreases as the turning speed V of the image capturing device 110 approaches a third speed V3 from the lower limit side (second speed V2 side) of the specified speed range. Alternatively, the system control circuit 120 may determine, as the intensity of cyclic NR, an intensity that increases as the turning speed V of the image capturing device 110 approaches the upper limit side (first speed V1 side) of the specified speed range from a fourth speed V4.

The third speed V3 and the fourth speed V4 are both within the specified speed range. Further, the third speed V3 is not higher than the fourth speed V4.

As described above, the system control circuit 120 continuously changes the intensity of cyclic NR according to the turning speed V of the image capturing device 110. This makes it possible to restrain a sudden change in images due to switching of the intensity of cyclic NR. A processing method such as the level of the continuous change of the intensity of cyclic NR and the timing to change is set experimentally or empirically according to the purpose of use or performance of the image capturing apparatus 100.

Next, the image capturing apparatus 100 according to a second exemplary embodiment will be described. Components that are similar to those in the above-described first exemplary embodiment are given the same reference numerals, and description thereof is omitted.

First, a subject tracking function included in the image capturing apparatus 100 according to the present exemplary embodiment will be described. The subject tracking function is a function in which the system control circuit 120 controls the image capturing device 110 so that the image capturing device 110 tracks a subject.

Next, the configuration of the image capturing apparatus 100 according to the present exemplary embodiment will be described.

The system control circuit 120 according to the present exemplary embodiment further includes the subject tracking function. The system control circuit 120 detects the location of the subject based on an image captured by the image capturing device 110 and determines information about the driving angle, moving amount, turning speed, and the like based on the detected location of the subject.

The system control circuit 120 performs control to turn the image capturing device 110 based on the information about the driving angle, moving amount, turning speed, and the like of the image capturing device 110 determined based on the detected location of the subject.

Figure 5:
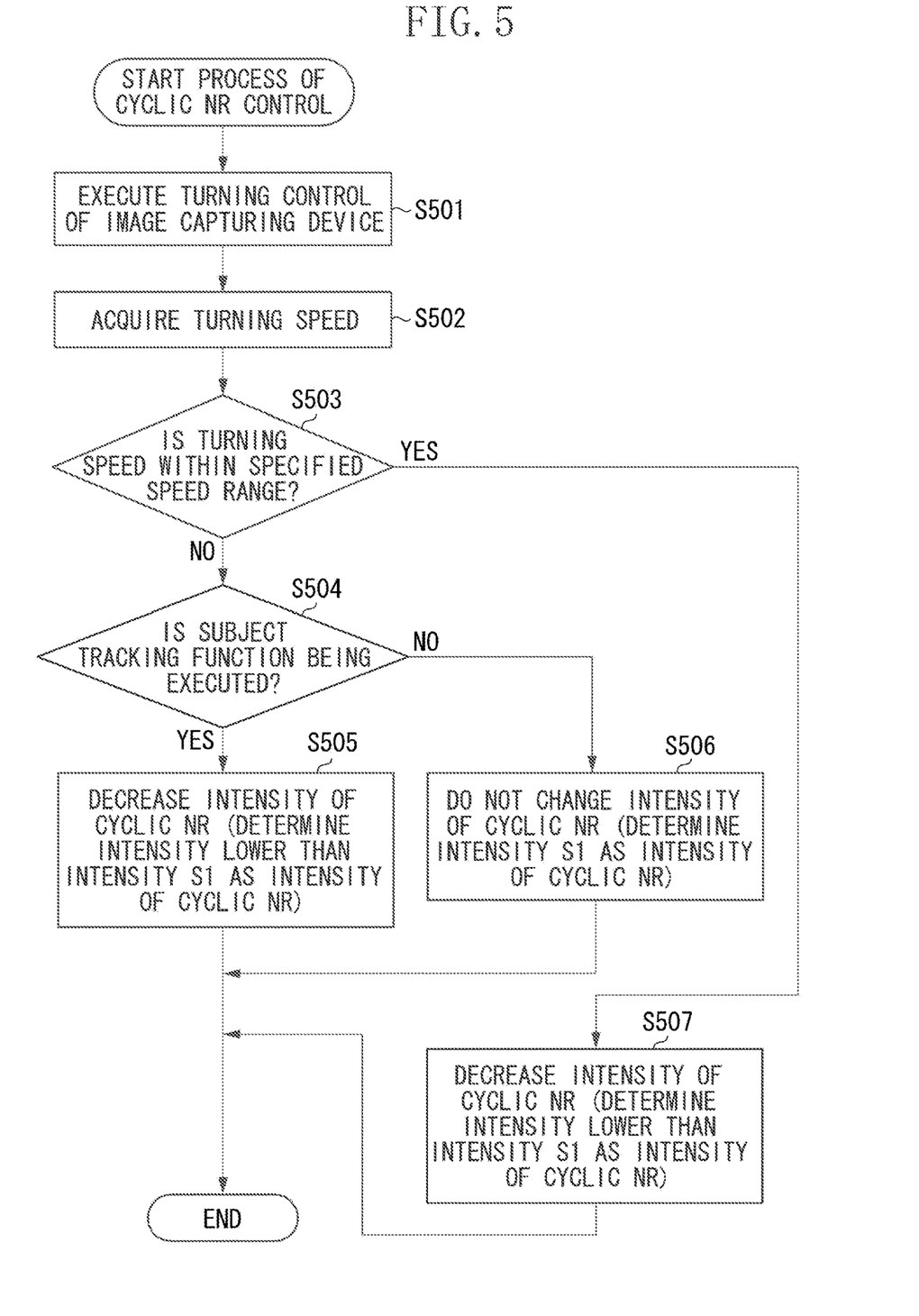
FIG. 5 is a flowchart illustrating a process of cyclic NR control according to a second exemplary embodiment.

Next, the process of cyclic NR control according to the present exemplary embodiment will be described with reference to FIG. 5. FIG. 5 is a flowchart illustrating the process of cyclic NR.

Steps S501 to S503 are similar to steps S201 to S203 in FIG. 2. In step S503, if the system control circuit 120 determines that the acquired turning speed V of the image capturing device 110 is within the specified speed range (YES in step S503), the processing proceeds to step S507. On the other hand, if the system control circuit 120 determines that the turning speed V of the image capturing device 110 is higher than a speed in the specified speed range or lower than a speed in the specified speed range (NO in step S503), the processing proceeds to step S504.

In step S504, the system control circuit 120 determines whether the subject tracking function is being executed. If the system control circuit 120 determines that the subject tracking function is being executed (YES in step S504), the processing proceeds to step S505. On the other hand, if the system control circuit 120 determines that the subject tracking function is not being executed (NO in step S504), the processing proceeds to step S506.

In step S505, the system control circuit 120 determines, as the intensity of cyclic NR, an intensity (e.g., intensity S2) that is lower than the intensity S1.

In step S506, the system control circuit 120 does not change the intensity of cyclic NR from the intensity of the initial state and determines the intensity S1 in the initial state as the intensity of cyclic NR.

In step S507, the system control circuit 120 determines, as the intensity of cyclic NR, an intensity (e.g., intensity S2) that is lower than the intensity S.

The image signal processing circuit 121 performs cyclic NR on the image of the target frame captured by the image capturing device 110 at the cyclic NR intensity determined by the system control circuit 120 in one of steps S505 to S507. Then, the image display device 150 displays the image having undergone cyclic NR.

In the case in which the image capturing apparatus 100 is used for monitoring, the image capturing device 110 of the image capturing apparatus 100 may be tracking the subject.

The system control circuit 120 according to the present exemplary embodiment decreases the intensity of cyclic NR when the subject tracking function is being executed even if the turning speed V of the image capturing device 110 is higher than a speed in the specified speed range.

Therefore, when the subject tracking function is being executed, even if the turning speed V of the image capturing device 110 is high, afterimages due to cyclic NR are restrained from occurring in images. This makes it possible to acquire high-visibility images of the subject that is a tracking target.

Next, the image capturing apparatus 100 according to a modified example of the second exemplary embodiment will be described. Components similar to those in the second exemplary embodiment are given the same reference numerals, and description thereof is omitted.

First, operation modes of the image capturing device 110 will be described. The image capturing device 110 includes first and second modes as its operation modes. The first mode is a daytime mode in which the image capturing device 110 captures images based on visible light. In the first mode, the image capturing device 110 captures color images. The second mode is a night mode in which the image capturing device 110 captures images based on visible light and infrared light. In the second mode, light from the subject is controlled not to pass through the IRCF, and the image capturing device 110 captures monochrome images.

Next, the configuration of the image capturing apparatus 100 will be described.

The image capturing apparatus 100 further includes an infrared illumination device in addition to the components of the image capturing apparatus 100 according to the second exemplary embodiment. The infrared illumination device provides infrared illumination based on the control performed by the system control circuit 120.

The system control circuit 120 controls the image capturing device 110 so that the shutter speed of the image capturing device 110 is higher when the subject tracking function of the image capturing apparatus 100 is executed than when the subject tracking function of the image capturing apparatus 100 is not executed.

The system control circuit 120 sets the operation mode of the image capturing device 110 based on the illuminance of the subject and a first illuminance threshold value. More specifically, for example, the system control circuit 120 sets the operation mode to the first mode if the illuminance of the subject is not lower than the first illuminance threshold value, whereas the system control circuit 120 sets the operation mode to the second mode if the illuminance of the subject is lower than the first illuminance threshold value. The system control circuit 120 may acquire the illuminance of the subject, for example, based on an output signal of the image sensor included in the image capturing device 110 or from an illuminance sensor included in the image capturing apparatus 100.

The system control circuit 120 controls the infrared illumination based on the illuminance of the subject and a second illuminance threshold value when the operation mode is the second mode. More specifically, the system control circuit 120, for example, controls the infrared illumination device to provide infrared illumination if the illuminance of the subject is lower than the second illuminance threshold value. Further, the system control circuit 120, for example, controls the infrared illumination device to stop infrared illumination if the illuminance of the subject is not lower than the second illuminance threshold value.

The system control circuit 120 sets the first illuminance threshold value so that the first illuminance threshold value is greater when the subject tracking function of the image capturing apparatus 100 is executed than when the subject tracking function of the image capturing apparatus 100 is not executed.

The system control circuit 120 sets the second illuminance threshold value so that the second illuminance threshold value is greater when the subject tracking function of the image capturing apparatus 100 is executed than when the subject tracking function of the image capturing apparatus 100 is not executed.

Figure 6:
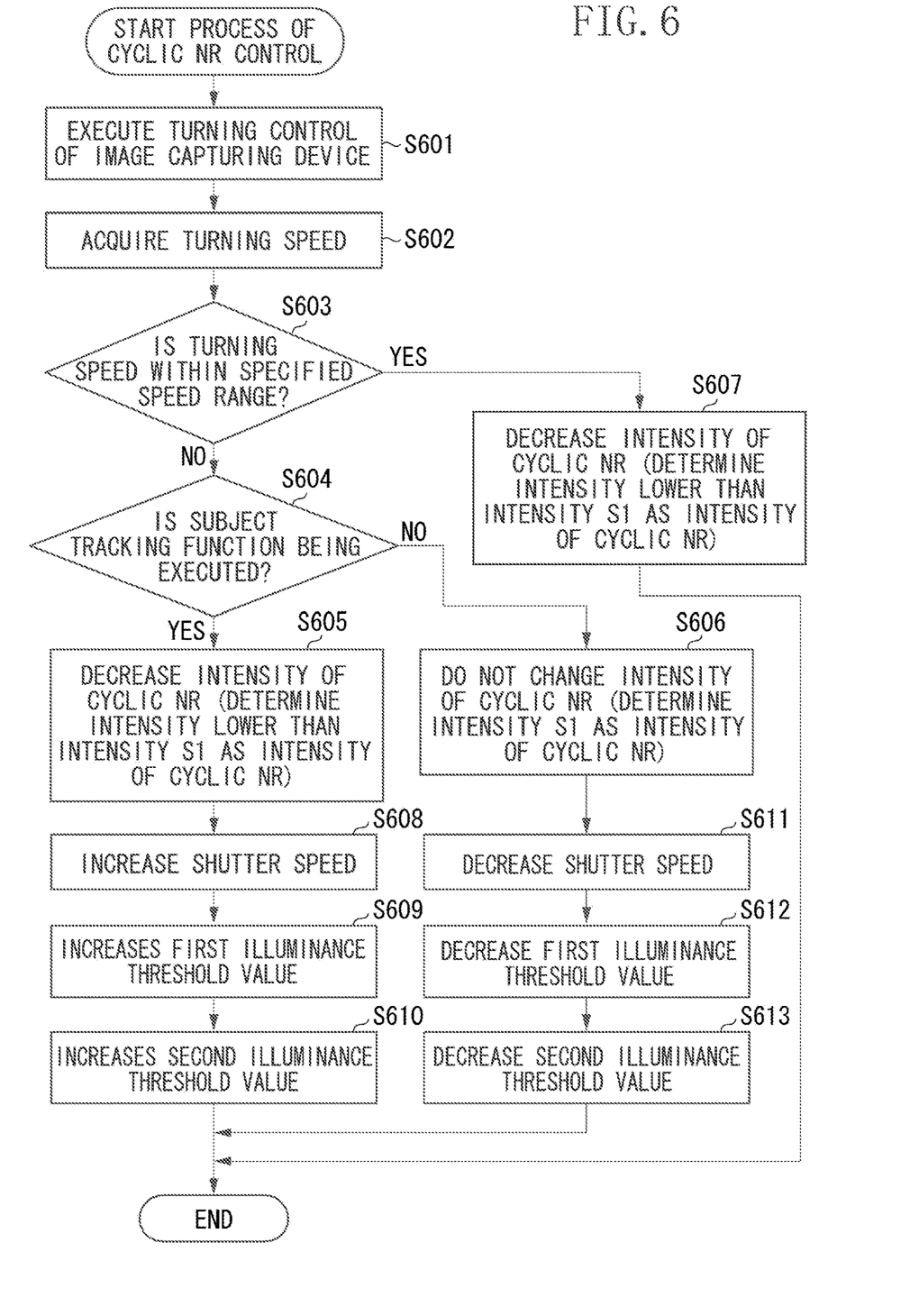
FIG. 6 is a flowchart illustrating a process of cyclic NR control according to a modified example of the second exemplary embodiment.

Next, the process of cyclic NR control according to the present modified example will be described with reference to FIG. 6. FIG. 6 is a flowchart illustrating the process of cyclic NR control.

Steps S601 to S607 in FIG. 6 are similar to steps S501 to S507 in FIG. 5.

In step S608, the system control circuit 120 controls the image capturing device 110 to increase the shutter speed of the image capturing device 110. More specifically, the system control circuit 120 controls the image capturing device 110 to set the shutter speed of the image capturing device 110 to a first shutter speed, which is a high-speed shutter speed.

In step S609, the system control circuit 120 increases the first illuminance threshold value. More specifically, the system control circuit 120 increases the first illuminance threshold value to a first high illuminance threshold value that is greater than a first low illuminance threshold value described below.

In step S610, the system control circuit 120 increases the second illuminance threshold value. More specifically, the system control circuit 120 increases the second illuminance threshold value to a second high illuminance threshold value that is greater than a second low illuminance threshold value described below.

In step S611, the system control circuit 120 controls the image capturing device 110 to decrease the shutter speed of the image capturing device 110. More specifically, the system control circuit 120 controls the image capturing device 110 to decrease the shutter speed of the image capturing device 110 to a second shutter speed that is a low-speed shutter speed.

In step S612, the system control circuit 120 decreases the first illuminance threshold value to a value smaller than the first high illuminance threshold value. More specifically, the system control circuit 120 decreases the first illuminance threshold value to the first low illuminance threshold value.

In step S613, the system control circuit 120 decreases the second illuminance threshold value to a value smaller than the second high illuminance threshold value. More specifically, the system control circuit 120 decreases the second illuminance threshold value to the second low illuminance threshold value.

As described above, in the present modified example, the system control circuit 120 controls the image capturing device 110 so that the shutter speed of the image capturing device 110 is higher when the subject tracking function of the image capturing apparatus 100 is executed than when the subject tracking function of the image capturing apparatus 100 is not executed. This restrains afterimages from occurring in images on which cyclic NR is performed. Therefore, images with high visibility are acquired.

Further, when the illuminance of the subject is low, the gain of the image sensor and the like becomes high, and the effect of afterimages in cyclic NR increases. However, the system control circuit 120 according to the present modified example sets the first illuminance threshold value so that the first illuminance threshold value is greater when the subject tracking function is executed than when the subject tracking function is not executed. Further, the system control circuit 120 sets the second illuminance threshold value so that the second illuminance threshold value is greater when the subject tracking function is executed than when the subject tracking function is not executed. Accordingly, when the illuminance of the subject is low, the operation mode is set to the second mode early, or infrared illumination is provided to maintain sufficient illuminance, so that the effect of afterimages in cyclic NR is reduced.

Next, the image capturing apparatus 100 according to a third exemplary embodiment will be described. Components that are similar to those in the above-described exemplary embodiments are given the same reference numerals, and description thereof is omitted.

First, the configuration of the image capturing apparatus 100 will be described. The system control circuit 120 further includes a motion detection function in addition to the components of the system control circuit 120 according to the above-described exemplary embodiments. The system control circuit 120 detects motions of the subject based on frame images captured by the image capturing device 110.

Figure 7:
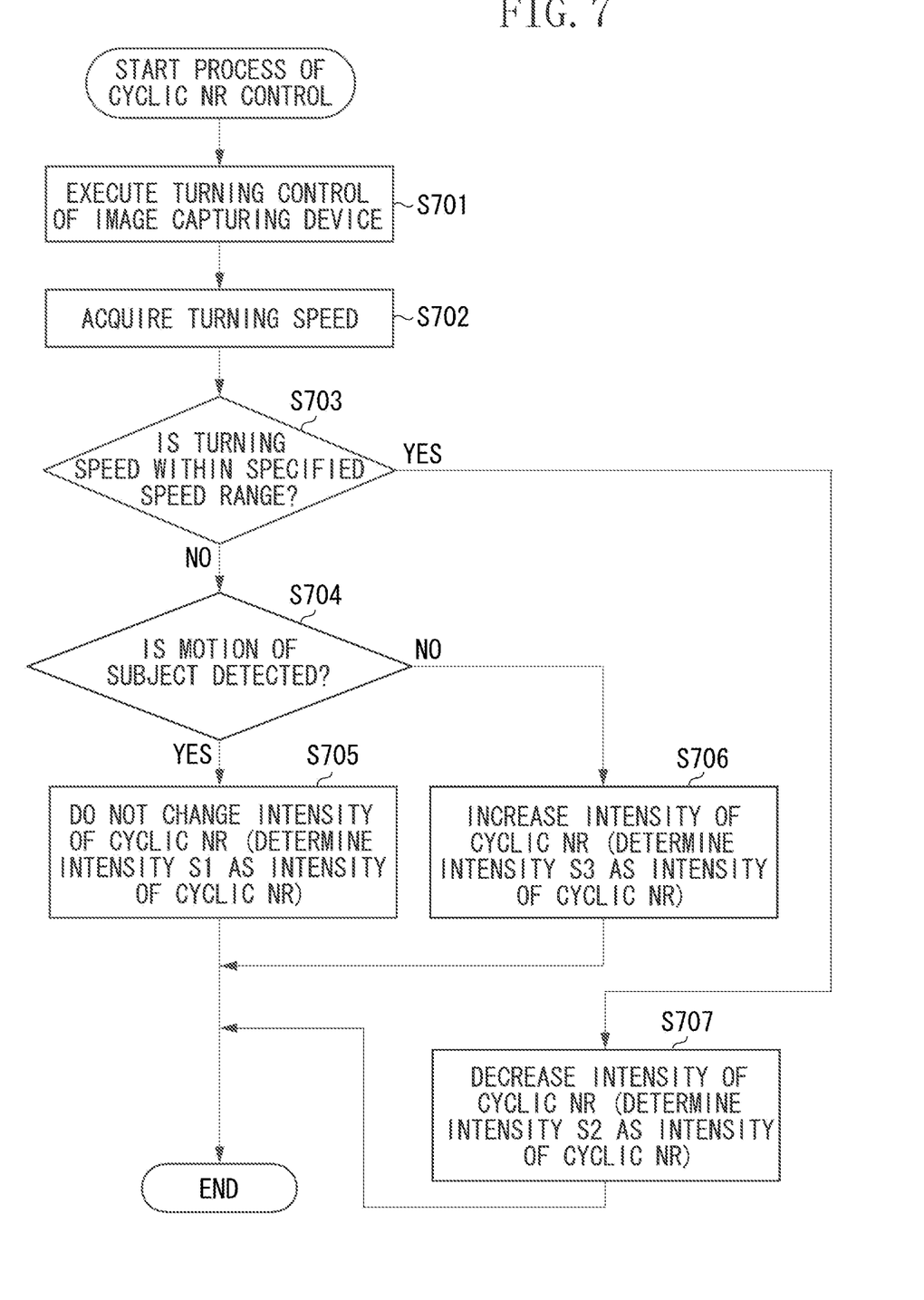
FIG. 7 is a flowchart illustrating a process of cyclic NR control according to a third exemplary embodiment.

Next, the process of cyclic NR control will be described with reference to FIG. 7. FIG. 7 is a flowchart illustrating the process of cyclic NR control. Steps S701 to S703 in the process of cyclic NR control in FIG. 7 are similar to steps S501 to S503 in FIG. 5.

In step S704, if a motion of the subject is detected (YES in step S704), the processing proceeds to step S705. On the other hand, if no motion of the subject is detected (NO in step S704), the processing proceeds to step S706.

In step S705, the system control circuit 120 does not change the intensity of cyclic NR from the intensity in the initial state and determines the intensity S1 in the initial state as the intensity of cyclic NR.

In step S706, the system control circuit 120 determines to increase the intensity of cyclic NR to an intensity S3 that is higher than the intensity S1.

In step S707, the system control circuit 120 determines to decrease the intensity of cyclic NR to the intensity S2 which is lower than the intensity S1.

The image signal processing circuit 121 performs cyclic NR on the image of the target frame captured by the image capturing device 110 at the cyclic NR intensity determined by the system control circuit 120 in step S705, S706, or S707. Then, the image display device 150 displays the image having undergone cyclic NR.

There are cases in which the subject is moving in images captured by the image capturing device 110 of the image capturing apparatus 100 and the user desires to visually recognize the subject. The system control circuit 120 according to the present exemplary embodiment decreases the intensity of cyclic NR so that the intensity of cyclic NR is lower when there is a moving subject than when there is no moving subject. Accordingly, when there is a moving subject, afterimages due to cyclic NR are restrained from occurring in images, compared to when there is no moving subject, so that images with high visibility can be acquired.

Other Exemplary Embodiments

In the above-described exemplary embodiments, the system control circuit 120 may determine the intensity of cyclic NR based on the focal length of the image capturing device 110 in addition to the turning speed V of the image capturing device 110, and the like. For example, the system control circuit 120 acquires the focal length of the image capturing device 110 from the image capturing device 110. Then, if the turning speed V of the image capturing device 110 is within the specified speed range, the system control circuit 120 determines, as the intensity of cyclic NR, an intensity that decreases as the focal length of the image capturing device 110 increases.

When the focal length of the image capturing device 110 is long, even if the image capturing device 110 is turned slightly, the angle of view changes significantly to increase the moving amount of the subject in the images captured by the image capturing device 110, and afterimages due to cyclic NR are more likely to occur. However, the system control circuit 120 determines, as the intensity of cyclic NR, an intensity that decreases as the focal length of the image capturing device 110 increases if the turning speed V of the image capturing device 110 is within the specified speed range. As a result, even if the focal length of the image capturing device 110 is long, afterimages due to cyclic NR are restrained from occurring in the images, and images with high visibility are acquired.

Further, in the above-described exemplary embodiments, the system control circuit 120 may determine the intensity of cyclic NR based on the shutter speed of the image capturing device 110 in addition to the turning speed V of the image capturing device 110, and the like. For example, the system control circuit 120 acquires the shutter speed of the image capturing device 110 from the image capturing device 110. Then, if the turning speed V of the image capturing device 110 is within the specified speed range, the system control circuit 120 determines, as the intensity of cyclic NR, an intensity that decreases as the shutter speed of the image capturing device 110 decreases.

When the shutter speed of the image capturing device 110 is low, afterimages are more likely to occur in images captured by the image capturing device 110. If cyclic NR is executed on such images, the effect of afterimages increases. However, the system control circuit 120 determines, as the intensity of cyclic NR, an intensity that decreases as the shutter speed of the image capturing device 110 decreases if the turning speed V of the image capturing device 110 is within the specified speed range. Accordingly, even if the shutter speed is low, afterimages due to cyclic NR are restrained from occurring in images, and images with high visibility are acquired.

Further, in the above-described exemplary embodiments, the system control circuit 120 may determine the intensity of cyclic NR based on the distance from the image capturing device 110 to the subject in addition to the turning speed V and the like of the image capturing device 110. For example, the system control circuit 120 determines the distance from the image capturing device 110 to the subject based on frame images captured by the image capturing device 110. Then, if the turning speed V of the image capturing device 110 is within the specified speed range, the system control circuit 120 determines, as the intensity of cyclic NR, an intensity that decreases as the distance from the image capturing device 110 to the subject decreases.

When the distance from the image capturing device 110 to the subject is small, even if the actual moving amount of the subject is small, the moving amount of the subject in images captured by the image capturing device 110 becomes large due to the turning of the image capturing device 110, and afterimages are more likely to occur in the images. However, the system control circuit 120 determines, as the intensity of cyclic NR, an intensity that decreases as the distance from the image capturing device 110 to subject decreases if the turning speed V of the image capturing device 110 is within the specified speed range. Accordingly, even if the distance from the image capturing device 110 to the subject is small, afterimages due to cyclic NR are restrained from occurring in images, and images with high visibility are acquired.

Further, in the above-described exemplary embodiments, the specified speed range may be a range expressed by formula (4) below, $$0 \le V < V1 \qquad (4).$$

At this time, for example, in step S203 in FIG. 2 in the first exemplary embodiment, if the acquired turning speed V of the image capturing device 110 is not lower than the first speed V1, the processing proceeds to step S204. Further, if the turning speed V of the image capturing device 110 is lower than the first speed V1, the processing proceeds to step S205. The same applies to the second exemplary embodiment and the like.

Further, in the above-described exemplary embodiments, at least a part of the process of cyclic NR control may be realized by a server other than the image capturing apparatus 100. For example, the server may execute steps S202 to S205 in FIG. 2, steps S502 to S507 in FIG. 5, steps S602 to S607 in FIG. 6, or steps S702 to S707 in FIG. 7. At this time, the server and the image capturing apparatus 100 transmit and receive data to and from each other via a communication network. The server is an example of an information processing apparatus and an image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-038110, filed Mar. 1, 2017, which is hereby incorporated by reference herein in its entirety.

What is claimed is:

1. An image processing apparatus comprising:
   at least one memory device;
   at least one processor;
   a determination unit configured to acquire a turning speed of an image capturing device that is capable of turning, to determine a first intensity as an intensity of noise reduction processing in a case where the turning speed is higher than a speed in a predetermined speed range, and to determine a second intensity that is lower than the first intensity as the intensity of the noise reduction processing in a case where the turning speed is within the predetermined speed range; and
   a processing unit configured to perform the noise reduction processing on an image of a target frame at the determined intensity based on the image of the target frame and an image of a frame preceding the target frame among a plurality of images of frames captured by the image capturing device,
   wherein the determination unit and the processing unit are implemented by the at least one processor executing at least one program recorded on the at least one memory device.

2. The image processing apparatus according to claim 1, wherein the noise reduction processing is cyclic type noise reduction processing, and
   wherein the intensity of the noise reduction processing is expressed by a cyclic coefficient.

3. The image processing apparatus according to claim 1, wherein, in a case where the turning speed is lower than the speed in the predetermined speed range, the determination unit determines an intensity higher than the second intensity as the intensity of the noise reduction processing.

4. The image processing apparatus according to claim 1, wherein the predetermined speed range is a range in which the turning speed V satisfies formula (1) below using a first speed and a second speed lower than the first speed, $$\text{second speed} < V < \text{first speed} \tag{1}.$$

5. The image processing apparatus according to claim 4, wherein the second speed is zero.

6. The image processing apparatus according to claim 1, wherein the determination unit decreases the intensity of the noise reduction processing as the turning speed approaches a third speed within the predetermined speed range from a lower limit side of the predetermined speed range.

7. The image processing apparatus according to claim 1, wherein the determination unit increases the intensity of the noise reduction processing as the turning speed approaches an upper limit side of the predetermined speed range from a fourth speed within the predetermined speed range.

8. The image processing apparatus according to claim 1, wherein the determination unit determines the intensity of the noise reduction processing further based on whether the image capturing device is controlled to track a subject.

9. The image processing apparatus according to claim 8, wherein, even if the turning speed of the image capturing device is higher than the speed in the predetermined speed range and in a case where the image capturing device is controlled to track the subject, the determination unit determines an intensity lower than the first intensity as the intensity of the noise reduction processing.

10. The image processing apparatus according to claim 8, further comprising a control unit configured to control the image capturing device so that a shutter speed of the image capturing device is higher in a case where the image capturing device is controlled to track the subject than in a case where the image capturing device is not controlled to track the subject,
    wherein the control unit is implemented by the at least one processor executing at least one program recorded on the at least one memory device.

11. The image processing apparatus according to claim 8, further comprising a control unit configured to set an operation mode of the image capturing device to one of a first mode in which an image is captured based on visible light and a second mode in which an image is captured based on visible light and infrared light, based on an illuminance of the subject and a first illuminance threshold value,
    wherein the control unit is implemented by the at least one processor executing at least one program recorded on the at least one memory device.

12. The image processing apparatus according to claim 11, wherein the control unit sets the first illuminance threshold value so that the first illuminance threshold value is greater in a case where the image capturing device is controlled to track the subject than in a case where the image capturing device is not controlled to track the subject.

13. The image processing apparatus according to claim 12, further comprising an illumination control device configured to control infrared illumination based on the illuminance of the subject and a second illuminance threshold value in a case where the operation mode is the second mode,
    wherein the control unit sets the second illuminance threshold value so that the second illuminance threshold value is greater in a case where the image capturing device is controlled to track the subject than in a case where the image capturing device is not controlled to track the subject.

14. The image processing apparatus according to claim 1, wherein the determination unit detects a motion of a subject from the plurality of images of the frames captured by the image capturing device and determines the intensity of the noise reduction processing based on whether the motion of the subject is detected.

15. The image processing apparatus according to claim 1, wherein, in a case where the turning speed of the image capturing device is within the predetermined speed range, the determination unit decreases the intensity of the noise reduction processing as a focal length of the image capturing device increases.

16. The image processing apparatus according to claim 1, wherein, in a case where the turning speed of the image capturing device is within the predetermined speed range, the determination unit decreases the intensity of the noise reduction processing as a shutter speed of the image capturing device decreases.

17. The image processing apparatus according to claim 1, wherein, in a case when the turning speed of the image capturing device is within the predetermined speed range, the determination unit decreases the intensity of the noise reduction processing as a distance from the image capturing device to a subject decreases.

18. A method for controlling an image processing apparatus, the method comprising:
    acquiring a turning speed of an image capturing device that is capable of turning;
    determining a first intensity as an intensity of noise reduction processing in a case where the turning speed is higher than a speed in a predetermined speed range, and determining a second intensity that is lower than the first intensity as the intensity of the noise reduction processing in a case where the turning speed is within the predetermined speed range; and performing the noise reduction processing on an image of a target frame at the determined intensity based on the image of the target frame and an image of a frame preceding the target frame among a plurality of images of frames captured by the image capturing device.

19. A non-transitory computer-readable storage medium storing a control program to be used by an image processing apparatus to perform a method for controlling the image processing apparatus, the method comprising:

acquiring a turning speed of an image capturing device that is capable of turning;

determining a first intensity as an intensity of noise reduction processing in a case where the turning speed is higher than a speed in a predetermined speed range, and determining a second intensity that is lower than the first intensity as the intensity of the noise reduction processing in a case where the turning speed is within the predetermined speed range; and performing the noise reduction processing on an image of a target frame at the determined intensity based on the image of the target frame and an image of a frame preceding the target frame among a plurality of images of frames captured by the image capturing device.

* * * * *